United States Patent
Sato et al.

(10) Patent No.: US 7,318,957 B2
(45) Date of Patent: Jan. 15, 2008

(54) ORGANIC MATERIAL-COATED SEMICONDUCTOR NANOPARTICLE WITH EXCELLENT DURABILITY, AND METHOD OF MANUFACTURING THE SAME

(75) Inventors: Keiichi Sato, Tokyo (JP); Susumu Kuwabata, Osaka (JP)

(73) Assignee: Hitachi Software Engineering Co., Ltd., Kanagawa (JP)

( * ) Notice: Subject to any disclaimer, the term of this patent is extended or adjusted under 35 U.S.C. 154(b) by 0 days.

(21) Appl. No.: 10/927,488

(22) Filed: Aug. 27, 2004

(65) Prior Publication Data

US 2005/0051771 A1    Mar. 10, 2005

(30) Foreign Application Priority Data

Sep. 9, 2003  (JP) .............................. 2003-316552
Dec. 11, 2003  (JP) .............................. 2003-413856

(51) Int. Cl.
   *B32B 5/16*   (2006.01)
(52) U.S. Cl. ...................... 428/403; 977/773; 977/813; 977/824; 977/830
(58) Field of Classification Search ................. 428/403; 977/773, 813, 824, 830
   See application file for complete search history.

(56) References Cited

U.S. PATENT DOCUMENTS

| | | | | |
|---|---|---|---|---|
| 4,715,986 A * | 12/1987 | Gruning et al. | ............. | 516/100 |
| 6,444,143 B2 * | 9/2002 | Bawendi et al. | ...... | 252/301.6 S |
| 6,468,808 B1 * | 10/2002 | Nie et al. | .................... | 436/524 |
| 6,649,138 B2 * | 11/2003 | Adams et al. | .............. | 423/403 |
| 7,169,832 B2 * | 1/2007 | Poppe et al. | ................ | 523/200 |
| 2003/0066998 A1 | 4/2003 | Lee | | |
| 2004/0106781 A1 * | 6/2004 | Emrick et al. | ............. | 530/400 |
| 2006/0145138 A1 * | 7/2006 | Sato et al. | .................... | 257/14 |

FOREIGN PATENT DOCUMENTS

WO    WO 2004/065362 A2    8/2003

OTHER PUBLICATIONS

European Search report dated Jun. 8, 2006.
Warren Chan et al., "Quantum Dot Bioconjugates for Ultrasensitive Nonisotopic Detection", Science, vol. 281, Sep. 25, 1998, pp. 2016-2018.
"Inductive Effect", from Wikipedia, the Free Encyclopedia. http://en.wikipedia.org/wiki/Inductive_effect, 2 pages.

* cited by examiner

*Primary Examiner*—H. T Le
(74) *Attorney, Agent, or Firm*—Reed Smith LLP; Stanley P. Fisher, Esq.; Juan Carlos A. Marquez, Esq.

(57) ABSTRACT

The resistance of a semiconductor nanoparticle provided with a surface treatment, such as an OH coating or ammonia treatment, against external factors is improved. A semiconductor nanoparticle provided with a surface treatment such as an OH coating or ammonia treatment and having high-emission properties is coated with an organic material, such as hexylamine, dodecylamine, trioctylmethylammonium, tridodecilmethylammonium, and similar organic material, by migrating the semiconductor nanoparticle from an aqueous phase to an organic solvent, such as hexane or toluene, thereby providing it with durability against external factors.

16 Claims, 15 Drawing Sheets

ORGANIC MATERIAL-COATED SEMICONDUCTOR NANOPARTICLE WITH EXCELLENT DURABILITY, AND METHOD OF MANUFACTURING THE SAME

BACKGROUND OF THE INVENTION

1. Field of the Invention

The present invention relates to a nanoparticle and a method of manufacturing the same. In particular, it relates to a nanoparticle that can maintain high-emission properties and that has an excellent durability, and a method of manufacturing the same. The invention also relates to a fluorescence reagent and an optical device comprising the nanoparticle.

2. Background Art

Nanoparticles such as semiconductor nanoparticles are characterized in that they can emit narrow and strong fluorescence of the full width at half maximum (FWHM). These are materials that have been gaining much attention, as they are capable of producing various fluorescent colors and are thought to provide an extremely wide range of applications in the future.

Because the semiconductor nanoparticles with particle sizes of not more than 10 nm are located in the transition region between bulk semiconductor crystals and molecules, they exhibit physicochemical properties that are different from those of either the bulk semiconductor crystals or molecules. In such a region, the degeneracy of energy bands that is observed in bulk semiconductors is removed and the orbits become discrete, and the quantum size effect appears in which the energy width in the forbidden band changes depending on the particle size. Due to the appearance of the quantum size effect, the width of energy in the forbidden band decreases or increases in response to an increase or decrease of the particle size. The change in the energy width in the forbidden band influences the fluorescent properties of the particle. A particle with a small particle size and a large energy band in the forbidden band has fluorescent wavelengths more towards the shorter wavelengths, while a particle with a large particle size and a smaller energy band in the forbidden band has fluorescent wavelengths more towards the longer wavelengths. Namely, the semiconductor nanoparticle is a material capable of producing any desired fluorescent colors by controlling the particle size, hence the attention it is gaining.

In order to utilize the semiconductor nanoparticle as a fluorescent material, the particle size must be controlled. In addition, if the particle size could be monodispersed, it could be expected that semiconductor nanoparticles would be prepared that have preferable fluorescent properties exhibiting a spectrum profile with narrow FWHM.

The semiconductor nanoparticle manufacturing process can be roughly divided into the preparation of particles and the monodispersion of particle sizes. Particles can be easily prepared by dissolving equimolecular amounts of precursors of Cd and X (X is S, Se, Te). This is the same for the manufacture using CdSe, ZnS, ZnSe, HgS, HgSe, PbS, PbSe, and so on. The thus prepared semiconductor nanoparticles exhibit a wide particle distribution to which a technique has been further attempted to monodisperse the particle distribution. For example, particle separation is conducted with high accuracy using a chemical technique in order to separate and extract only nanoparticles of a particular particle size. Examples of this method that have so far been reported include the electrophoretic separation method taking advantage of the variation of surface charge of the nanoparticle depending on particle size, the exclusion chromatography taking advantage of the difference in retention time depending on particle size, and the size-selective precipitation method taking advantage of the difference in dispersibility into an organic solvent depending on particle size.

In the aforementioned method, semiconductor nanoparticles prepared by mixing precursors are classified according to particle size. On the other hand, a method has also been reported that attempts to carry out the preparation of particles and the monodispersion of particle sizes at the same time. A typical example is a reversed micelle method. In this method, amphipathic molecules, such as diisooctyl sodium sulfosuccinate, and water are mixed in an organic solvent, such as heptane, thereby forming a reverse micelle in the organic solvent, such that precursors are reacted with each other using only the aqueous phase in the reverse micelle. The size of the reverse micelle is determined by the quantitative ratio of the amphipathic molecules to the water, so that the size can be relatively uniformly controlled. The size of the nanoparticle prepared is dependent on the size of the reverse micelle, so that it is possible to prepare semiconductor nanoparticles with relatively uniform particle sizes. Other methods for simultaneously preparing particles and monodispersing particle sizes are disclosed in J. Phys. Chem. B. 101: 9463 (1997) and JP Patent Publication (Kohyo) No. 2001-523758 A, for example, wherein the Ostwald ripening phenomenon is utilized with the use of trioctylphosphine (TOP) or trioctylphosphineoxide (TOPO). However, the preparation methods disclosed in the above reports are characterized in that a reagent with high toxicity is synthesized at high temperatures and are therefore not necessarily superior from the viewpoint of safety.

An alternative method called size-selective photoetching method takes advantage of photochemical reaction. In this method, the particle sizes in a solution of semiconductor nanoparticles prepared with a wide particle size distribution are monodispersed by utilizing the oxidized-melting of a metal chalcogenide semiconductor upon light irradiation in the presence of dissolved oxygen. For example, when CdS nanoparticles are optically excited in the presence of dissolved oxygen, the excited electrons promote a reduction reaction in which oxygen is reduced, and the holes promote an oxidation reaction in which the CdS nanoparticles themselves are dissolved. This photocatalytic reaction proceeds while the semiconductor nanoparticles are excited. Namely, the dissolving reaction of all of the excited semiconductor nanoparticles ends with the particle size that has a forbidden band width corresponding to the energy of the minimum wavelength of the irradiating light. Specifically, by irradiating the semiconductor nanoparticles having a wide particle size distribution with light with a shorter wavelength than the wavelength of the absorption edge of the semiconductor nanoparticles, semiconductor nanoparticles with large particle sizes can be selectively irradiated and dissolved into smaller, uniform semiconductor nanoparticles. In this method, nanoparticles that are monodispersed at any desired particle size can be relatively safely prepared at room temperature by simply selecting the wavelength of irradiating light. Moreover, by using monochromatic light for irradiation, the monodispersing process can be more accurately performed.

Meanwhile, the inventors' research showed that the quality of the semiconductor nanoparticles that have been monodispersed by the size-selective photoetching method varies greatly. They also showed that the variation is particularly significant in cases where a surface reformulation is provided to the semiconductor nanoparticles. After extensive research and studies, the inventors realized that the pH value during size-selective photoetching is to a large extent involved as a cause of the variation. Namely, it is possible to prepare particles with high reproducibility by controlling the pH value during size-selective photoetching reaction.

Prior to photo-irradiation, the particle size distribution of the semiconductor nanoparticles obtained by the aforementioned preparation methods extends more than 15% of the average particle size in terms of standard deviation. After photo-irradiation, when the irradiation light wavelength is 476.5 nm, the standard deviation (rms) has a very narrow particle size distribution of about 6% of the average particle size.

However, the fluorescent properties of the semiconductor nanoparticles prepared by these methods exhibit a smooth fluorescent spectrum without any peaks. Moreover, the fluorescent spectrum has a peak at a different wavelength than a theoretical value of fluorescence at which the semiconductor nanoparticles are supposed to emit light. Namely, besides the band gap fluorescence emitted from the inside of the semiconductor nanoparticles, the semiconductor nanoparticles emit a totally separate fluorescence for which the energy level that exists in the forbidden band of the energy levels inside the semiconductor nanoparticles is thought to be responsible. These energy levels producing the separate fluorescence are thought to exist mainly in the surface sites of the semiconductor nanoparticles. This is a phenomenon obstructing the properties of the semiconductor nanoparticles with a narrow particle size distribution and has been a problem to be solved, as the change in fluorescent properties caused by controlling the size of semiconductor nanoparticles is supposed to appear in the band gap fluorescence.

In a typical method of solving the aforementioned problem, a semiconductor material as a core is coated with another semiconductor material, an inorganic material, and an organic material that have a wider band gap than that of the core's semiconductor material, thus constructing a layered structure in an attempt to suppress the aforementioned fluorescence.

In typical methods of coating an inorganic material, CdS is coated on a CdSe nanoparticle, as described in J. Phys. Chem. B. 100: 8927 (1996), ZnS is coated on a CdS nanoparticle, as described in J. Phys. Chem. 92: 6320 (1988), and ZnS is coated on a CdSe nanoparticle, as described in J. Am. Chem. Soc. 112: 1327 (1990). With regard to the coating of a CdSe nanoparticle with ZnS as described in J. Phys. Chem. B. 101: 9463 (1997) or JP Patent Publication (Kohyo) No. 2001-523758 A, a semiconductor nanoparticle that has sufficient fluorescent properties has been successfully obtained by adopting a manufacturing method that utilizes the Ostwald ripening phenomenon and that is conducted in a coordination solvent.

The complex-layered semiconductor nanoparticle described above is a material that has a larger band gap than that of the semiconductor nanoparticle. The coating with a substance that does not have a band gap in the forbidden band of the semiconductor nanoparticle is carried out in an attempt to suppress the defective site on the surface of the semiconductor nanoparticle and obtain the inherent fluorescent properties of the semiconductor nanoparticle.

A method of performing a surface treatment in an aqueous solution is disclosed in J. Am. Chem. Soc. 109: 5655 (1987), in which it is reported that the fluorescent properties of the semiconductor nanoparticle in an alkaline aqueous solution has improved. Although various experiments and reports have been made based on this report, none have successfully shed light on the mechanism of such an improvement (J. Phys. Chem. Soc. 100: 13226 (1996) and J. Am. Chem. Soc. 122: 12142 (2000), for example). Moreover, all of the semiconductor nanoparticles in the alkaline aqueous solution have poor reproducibility, such that the conditions for reproduction have not been identified. Furthermore, none of the experiments and reports have successfully isolated a final substance.

As an example of the method of coating with an organic material, there is a synthesizing method that utilizes the Ostwald ripening phenomenon in a coordination solvent. This method employs TOPO (trioctylphosphine) or hexadecylamine (HDA) as the coating material, for example, to obtain semiconductor nanoparticles with high light-emission properties (J. Phys. Chem. B. 101: 9463 (1997)). It should be noted, however, that the final product of the semiconductor nanoparticle is not water-soluble.

The semiconductor nanoparticle obtained by the above-described methods is capable of suppressing a defect site to some extent and has the inherent properties of a semiconductor nanoparticle to some extent. However, in order to prepare such a semiconductor nanoparticle, a highly sophisticated technique is required, and in order to achieve high quality, a variety of equipment is required. Further, they are seriously deficient for the purpose of industrial production in terms of the cost of reagents or the like and the safety during high temperature reaction.

The inventors have conducted research and studies in order to find alternative methods, as well as trying to solve the aforementioned problem. As mentioned above, the surface condition of the semiconductor nanoparticle is thought to be involved in the defective fluorescence of a monolayer semiconductor nanoparticle. Based on this hypothesis, the inventors conducted an analysis of the influence of the surface condition of the semiconductor nanoparticle. As a solution for the relevant defects, the inventors conducted the analysis, focusing on the fact that the emission properties of semiconductor nanoparticles in the aforementioned alkaline aqueous solution are very good. As a result, they eventually succeeded in isolating and purifying semiconductor nanoparticles to which a surface treatment has been conducted in an alkaline solution, and also found a method of rendering the semiconductor nanoparticle water-soluble. Specifically, a semiconductor nanoparticle is given a surface-treating material that provides it with one or more kinds of electron-releasing group, such that the electron-releasing groups are arranged on the surface of the core of the semiconductor nanoparticle, thereby drawing high-emission properties. In this method, the particle can be rendered water-soluble depending on the type of the surface-treating material.

The semiconductor nanoparticle with the high-emission properties prepared by this method, however, is easily influenced by external factors, such as a change in pH.

The semiconductor nanoparticle has such a property that it is more durable than the currently available reagents such as organic pigment, and it hardly fades. Moreover, by changing the particle size, reagents that exhibit a variety of narrow FWHM spectra can be prepared using the same material. Thus, the semiconductor nanoparticle can be applied not only to optical devices but also to biopolymer detection and bioimaging, for example. The semiconductor nanoparticle is thus extremely versatile and is therefore gaining much attention in recent years, and its practical application has been an important issue among the researchers in recent years.

SUMMARY OF THE INVENTION

The inventors have invented a surface treating technique, including an OH coating and ammonia treatment, as a surface reformulation technique for semiconductor nanoparticles. However, the semiconductor nanoparticle provided with a surface treatment such as the OH coating or ammonia treatment does not have sufficient durability against external factors, such as, typically, the pH.

In order to protect the semiconductor nanoparticle from the aforementioned external factors, a nanoparticle obtained is coated with an organic material. Specifically, a semiconductor nanoparticle with high-emission properties prepared in an aqueous solution is taken into an organic material that has a specific functional group in order to significantly reduce the influence of external factors and provide durability. For the semiconductor nanoparticle coated with the organic material, an equal environment as that in the aqueous solution is maintained such that the high-emission properties of the particle can be maintained.

In one aspect, the invention provides a nanoparticle that has an excellent durability. The surface of the nanoparticle is provided with an electron-releasing group. An organic group is bound to an external shell of the layer containing the electron-releasing group. FIG. 1 shows the concept of the semiconductor nanoparticle with an excellent durability according to the invention.

Preferably, the electron-releasing group is at least one selected from the group consisting of —OR, —OCH$_2$R, —OCOCH$_2$R, —NHR, —N(CH$_2$R)$_2$, —NHCOCH$_2$R, —CH$_2$R, and —C$_6$H$_4$R, where R is selected from hydrogen and substituted or unsubstituted hydrocarbon groups. Particularly, a hydroxyl group is preferably selected as the electron-releasing group. The layer containing the electron-releasing group may be either a monolayer or a complex layer.

The organic group constituting the external shell of the layer containing the electron-releasing group is preferably selected from the group consisting of at least one selected from the group consisting of primary amines (R$_1$NH$_2$), secondary amines (R$_1$R$_2$NH), tertiary amines (R$_1$R$_2$R$_3$N), quaternary ammonium compounds (R$_4$R$_5$R$_6$R$_7$N$^+$), where R1 to R7 are selected from hydrogen and substituted or unsubstituted hydrocarbon groups. In particular, alkylamine with a carbon number from 4 to 20 is preferable as the primary amines (R$_1$NH$_2$). As the quaternary ammonium compounds (R$_4$R$_5$R$_6$R$_7$N$^+$), structures that have two or more alkyl chains with a carbon number from 4 to 20 are particularly preferable. The organic group should preferably comprise a polymerization of monomers with a polymeric unsaturated bond, for example, as this would improve the durability of the semiconductor nanoparticles. With regard to R$_1$ to R$_7$, the substituent in cases where the hydrocarbon group is substituted is not particularly limited. Specifically, however, examples include functional groups such as carboxyl groups, hydrocarbon groups, mercapto groups, amino groups, cyano groups, nitro groups, C (=O)NH$_2$, sulfonate groups, phosphate groups, Succinimidyl groups, maleimide groups, vinyl groups, and epoxy groups. Preferable examples of substituents having binding groups capable of producing these functional groups include ester groups, ether groups, thioester groups, thioether groups, sulfide groups, and amide groups. Further, the derivatives of these substituents are also included.

The material of the semiconductor nanoparticles in the present invention is not particularly limited. Preferably, however, at least one is selected from the group consisting of ZnO, ZnS, ZnSe, ZnTe, CdO, CdS, CdMnS, CdSe, CdMnSe, CdTe, CdMnTe, HgS, HgSe, HgSe, HgTe, InP, InAs, InSb, InN, GaN, GaP, GaAs, GaSb, TiO$_2$, WO$_3$, PbS, PbSe, MgTe, AlAs, AlP, AlSb, AlS, Ge, and Si. Alternatively, the nanoparticle should preferably have a complex structure consisting of a core portion and a shell portion that are made of at least one selected from said group. While semiconductor nanoparticles have been described above, the invention is also effective in cases where the size-selective etching method is applied to nanoparticles other than semiconductor nanoparticles, such as metal nanoparticles including Ag and Au, or nanoparticles of monocrystal carbon (diamond) to which the size-selective etching method is applicable.

The nanoparticle with an excellent durability according to the invention has monodispersed particle sizes, which exhibit a variation of less than 10% rms in diameter.

The nanoparticle with an excellent durability according to the invention has excellent emission properties, particularly fluorescent properties, and it emits light within a narrow spectrum range of less than 60 nm in terms of FWHM upon irradiation by excitation light.

In another aspect, the invention provides a method of manufacturing a particle that has fluorescent properties and an excellent durability. The method comprises adding a surface treating material to a semiconductor nanoparticle so as to provide it with one or more kinds of electron-releasing groups and arranging the electron-releasing group on the surface of the semiconductor nanoparticle, dissolving the semiconductor nanoparticle on which the electron-releasing group is arranged into a water-soluble solvent, and migrating the semiconductor nanoparticle on which the electron-releasing group is disposed from the water-soluble solvent to an oil solvent, in the presence of a surfactant or an amphipathic organic compound, for example.

Preferably, the surface treating material for giving the electron-releasing group to the surface of the semiconductor nanoparticle surface is at least one of nitrogenated compounds selected from the group consisting of pure metal, metal compounds, ammonia, amines, ammoniums, nitrites, isocyanates, or at least one of oxygenated compounds selected from the group consisting of alcohols, phenols, ketones, aldehydes, carboxylic acids, esters of organic or inorganic acids, ethers, acid amides, and acid anhydrides.

Preferably, the step of arranging the electron-releasing group on the surface of the semiconductor nanoparticle is performed in an alkali environment. In particular, the step of arranging the electron-releasing group on the surface of the semiconductor nanoparticle involves reacting the semiconductor nanoparticle with an active hydrogen containing compound in an alkali environment. More specifically, the pH of the alkali environment should preferably be 9 to 11 where CdS is used.

In accordance with the method of manufacturing the semiconductor nanoparticle of the invention, the electron-releasing group should preferably be a hydroxyl group, and the layer containing the electron-releasing group for giving an electron-releasing group to the surface of the semiconductor nanoparticle should preferably be a metal hydroxide.

As the surfactant or the amphipathic organic compound, at least one should preferably be selected from the group consisting of primary amines (R$_1$NH$_2$), secondary amines (R$_1$R$_2$NH), tertiary amines (R$_1$R$_2$R$_3$N), quaternary ammonium compounds (R$_4$R$_5$R$_6$R$_7$N$^+$), where R1 to R7 are selected from the group consisting of hydrogen and substituted or unsubstituted hydrocarbon groups. Particularly, the primary amines (R$_1$NH$_2$) and quaternary ammonium compounds ($R_4R_5R_6R_7N^+$) are preferable. Of the primary amines, one with a carbon number of not less than 4 is preferable. Of the quaternary ammonium compounds, a structure having two or more alkyl chains with a carbon number of 4 to 20 is preferable. With regard to the aforementioned compound, the surface modifying material can be modified as desired via molecular design of the surfactant or the amphipathic organic compound. For example, $R_1$ to $R_7$ can be provided with a substituent on the opposite end to an amino group or ammonium group. Using this substituent, it becomes possible to change the physical properties of the nanoparticle as desired, or to conduct a further chemical denaturation.

Furthermore, in accordance with the invention, with regard to $R_1$ to $R_7$, by employing a water-insoluble surfactant or amphipathic organic compound with a large carbon number, it becomes possible to condense the nanoparticle on which electron-releasing groups are arranged in the surfactant or the amphipathic organic compound. By so doing, the subsequent post-processes or chemical denaturation can be effectively performed, and it would also improve the ease of handling.

When a water-insoluble surfactant or amphipathic organic compound with a large carbon number is used as $R_1$ to $R_7$, it is effective to employ a polar solvent as a migration promoting agent for promoting the migration of the nanoparticles on which electron-releasing groups are arranged from a water-soluble solvent to an oil solvent. The polar solvent should preferably comprise at least one selected from the group consisting of alcohols including methyl alcohol, ethyl alcohol, propyl alcohol, and butyl alcohol, sulfoxide solvents including dimethyl sulfoxide, and amide solvents including N-dimethylformamide, N, N-dimethylacetamide, and N-methylpyrrolydone. For example, when dodecylamine is used as the water-insoluble surfactant or amphipathic organic compound with a large carbon number, dodecylamine, which is water-insoluble, promotes the migration from the water-soluble solvent to an organic phase upon addition of methanol.

Preferably, the organic material layer should comprise a polymerization of monomers or polymers including a polymeric unsaturated bond, for example, as this would improve the durability of the semiconductor nanoparticles.

Preferably, a nanoparticle provided with a surface modification and purified should be used as a starting material. Particularly, the surface modification should preferably be provided using a thiol compound.

Preferably, functional group substitution should be performed on the surface of the nanoparticle that is modified with a thiol group by ionizing and isolating the thiol compound in an alkali environment and then adding a surface treatment material that gives an electron-releasing group.

In a third aspect, the invention provides a fluorescent reagent comprising a nanoparticle with an excellent durability.

In a fourth aspect, the invention provides an optical device comprising a nanoparticle with an excellent durability.

In a fifth aspect, the invention provides an inorganic, organic, or organic/inorganic compound material with fluorescent properties and comprising a nanoparticle with an excellent durability.

In accordance with the invention, the high-emission properties of the nanoparticles provided with a surface treatment, such as an OH coating or ammonia treatment, can be maintained in an organic solvent. This is particularly advantageous in providing the nanoparticles with durability against external factors by providing them with a coating of an organic material.

DESCRIPTION OF THE PREFERRED EMBODIMENTS

Figure 1:
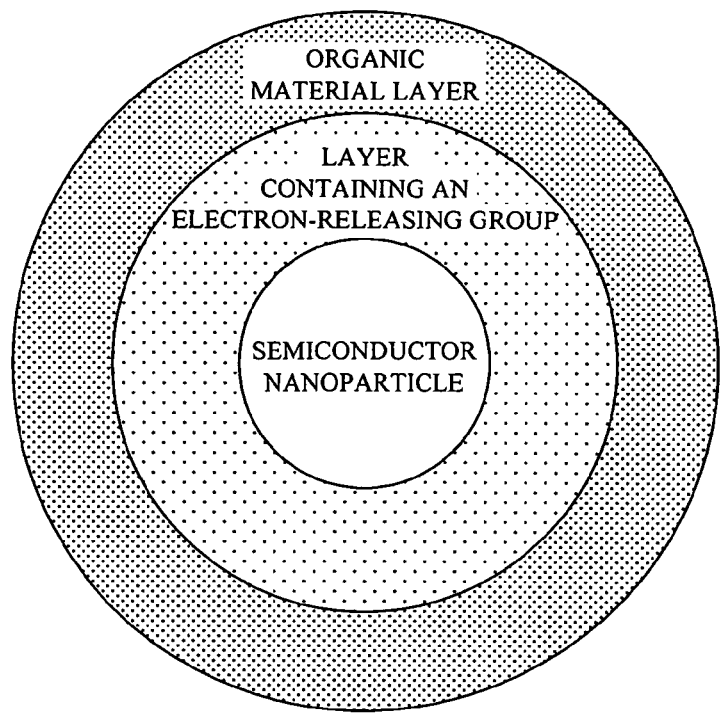
FIG. 1 shows a conceptual diagram of a semiconductor nanoparticle according to the invention that has an excellent durability.

A method of manufacturing a semiconductor nanoparticle according to the invention is described by way of example in the following. While the following example involves the size-selective photoetching method, any other technique may be employed as long as it is capable of obtaining a stabilized or modified semiconductor nanoparticle as a final product.

Method of Preparing a Semiconductor Nanoparticle

Semiconductor nanoparticles have a surface area that is extremely large in comparison with its volume, and they are easily agglomerated. Therefore, in order to allow the semiconductor nanoparticles to exist stably, measures must be taken to prevent the collision or fusion of particles. A variety of methods have so far been devised for this purpose, which can be roughly divided into the physical isolation of individual semiconductor nanoparticles by taking them into a solid and a polymer matrix, and the inactivation of the particle surface by chemically modifying a metal ion site on the particle surface with a low-molecular-weight organic material that has a high level of ability of forming a complex with the metal ion site. Based on the latter concept, hexametaphosphate is used as a stabilizing agent in the present method.

One thousand ml of an aqueous solution of sodium hexametaphosphate (0.1 mmol) and cadmium perchlorate (0.2 mmol) is prepared, to which disodium hydrogen phosphate (1.0 mmol) is added. Then, bubbling is performed in the solution using nitrogen gas, and hydrogen sulfide gas is injected into the solution while stirring the same violently. The stirring is continued for a time during which the color of the solution changes from being optically transparent colorless to optically transparent yellow.

At this time, although semiconductor nanoparticles that have been stabilized by hexametaphosphate already exist in the solution, they have a wide particle size distribution and their standard deviation extends more than 15% of the average particle size. The overall fluorescent intensity of the semiconductor nanoparticles in this state is very weak.

The size-selective photoetching method is described below. The physicochemical properties of semiconductor nanoparticles appear in dependence on particle size due to the quantum size effect. Thus, physical properties in this state are averaged, so that the properties of the semiconductor nanoparticles cannot be fully exploited. Accordingly, it is necessary to accurately conduct a particle-size separation from the semiconductor nanoparticles immediately after preparation that have a wide particle-size distribution, using a chemical technique, so that only semiconductor nanoparticles of a specific particle size can be isolated and extracted to achieve monodispersion. As a method of performing this operation, the size-selective photoetching method can be employed. This method utilizes the fact that the energy gap increases due to the quantum size effect as the particle size of the semiconductor nanoparticles decreases, and that a metal chalcogenide semiconductor undergoes oxidizing melting as it is irradiated with light in the presence of dissolved oxygen. Specifically, semiconductor nanoparticles with a wide particle-size distribution are irradiated with monochromatic light of a wavelength shorter than the wavelength of the absorption edge of the particles, so that semiconductor nanoparticles with larger particle sizes are selectively optically excited and dissolved, thereby obtaining smaller semiconductor nanoparticles with uniform particle size.

First, bubbling is performed using nitrogen gas in the above-described semiconductor nanoparticle solution that is stabilized by hexametaphosphate and that has a wide particle-size distribution. Another bubbling is conducted using oxygen for 10 min. Then, methylviologen is added to the solution to 50 μmol/L, and laser is irradiated while stirring. The irradiation of monochromatic light in the present invention is conducted to optically dissolve the semiconductor nanoparticles, and the wavelength of the monochromatic light is about 460 nm. By changing the wavelength of the monochromatic light, the fluorescent wavelength at the peak of the fluorescent spectrum of the semiconductor nanoparticles can be controlled.

When the thus obtained semiconductor nanoparticles are irradiated with light with wavelength 476.5 nm, the particles exhibit a very narrow particle-size distribution where the standard deviation is 0.19 nm against an average particle size of 3.2 nm, which means the standard deviation is about 6% of the average particle size. Thus, a solution of semiconductor nanoparticles that is extremely close to monodispersion can be obtained.

In this process, the semiconductor nanoparticles in the solution are monodispersed and come to produce band gap fluorescence that exhibits a narrow FWHM spectrum corresponding to the irradiating monochromatic light and the particle size of the semiconductor nanoparticles. The defective fluorescence, which is believed mainly due to the energy level on the surface of the semiconductor nanoparticles, is emitted with a stronger intensity than the band gap fluorescence intensity. Such a defective fluorescence is fundamentally considered a factor obstructive to the properties of the semiconductor nanoparticles and should therefore be suppressed.

Method for Modification of the Surface of Semiconductor Nanoparticles and Purification In order to purify the monodispersed semiconductor nanoparticles obtained by the above-described method that is stabilized by hexametaphosphate, surface modification was provided by adding 50 μL of mercaptopropionic acid (MPA) and then stirring for several hours. The solution was then ultrafiltrated to remove the methylviologen, hexametaphosphate, unreacted thiol compounds, and ions that dissolved during photoetching, for example, thereby obtaining a solution of semiconductor nanoparticles stabilized by pure thiol compounds. Thereafter, 1 L of the resultant semiconductor nanoparticles the surface of which is modified by the thiol compounds was condensed by ultrafiltration to 10 mL, and then washing with pure water was conducted.

Methods of Treating the Surface of Semiconductor Nanoparticles

A surface treatment was conducted using the purified and thiol-modified nanoparticles obtained by the above method. Examples of surface treatment are described below.

EXAMPLES

Example 1-1

(Surface Treatment with Sodium Hydroxide)

In this example, the surface treatment employed sodium hydroxide.

The purified and thiol-modified nanoparticle aqueous solution obtained as described above was diluted to an absorbance of 0.5 using 0.1 M NaOH—HCl, ph 11 aq. The solution was allowed to stand for several days to several weeks to treat the surface, thereby obtaining a semiconductor nanoparticle solution with high-emission properties. The resultant solution was optically transparent yellow and had superior emission properties.

Example 1-2

In this example, the surface treatment employed ammonia water.

The purified and thiol-modified nanoparticle aqueous solution obtained as described above was diluted to an absorbance of 0.5 using 0.1 M $NH_3$ aq. The solution was allowed to stand for several days to several weeks to treat the surface, thereby obtaining a semiconductor nanoparticle solution with high-emission properties. The resultant solution was optically transparent yellow and had superior emission properties.

Method of Coating the Surface of Semiconductor Nanoparticles

Example 2-1

NaOH Treatment/Hexylamine/Toluene

A mixture solution of toluene and hexylamine, the latter of an amount that was 10% that of the former, was added to an equal amount of the semiconductor nanoparticle aqueous solution prepared in Example 1-1. After violently stirring for some time, it was confirmed that an optically transparent yellow portion migrated from an aqueous phase to an organic phase through a stage in which a yellow powdery substance was observed at the water-toluene interface. Thereafter, centrifugation was carried out and the aqueous phase and the organic phase were separated. The recovered organic phase was then diluted by adding toluene to the same amount as the amount of the aforementioned aqueous solution prior to migration. The semiconductor nanoparticles that migrated to a toluene phase still maintained high-emission properties.

Figure 2:
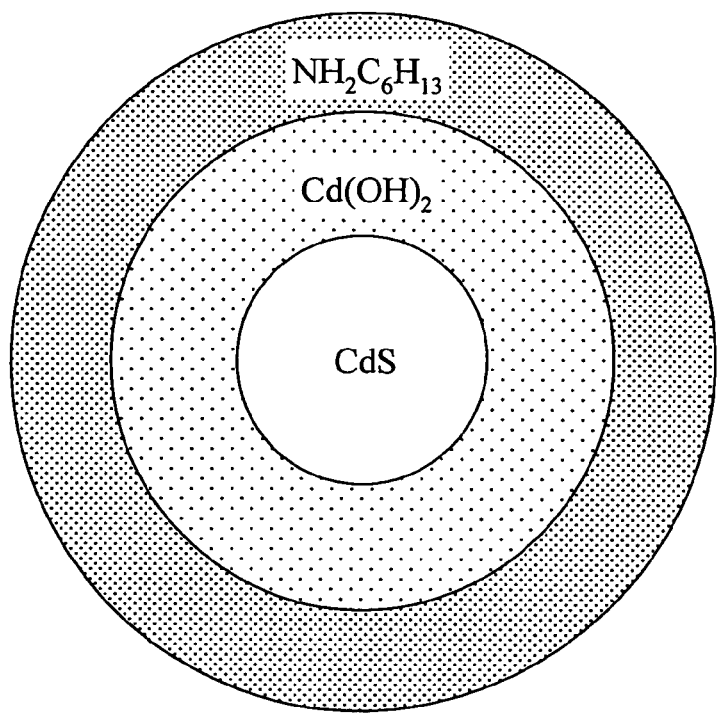
FIG. 2 shows a concrete example of the semiconductor nanoparticle of the invention that has an excellent durability.
Figure 3:
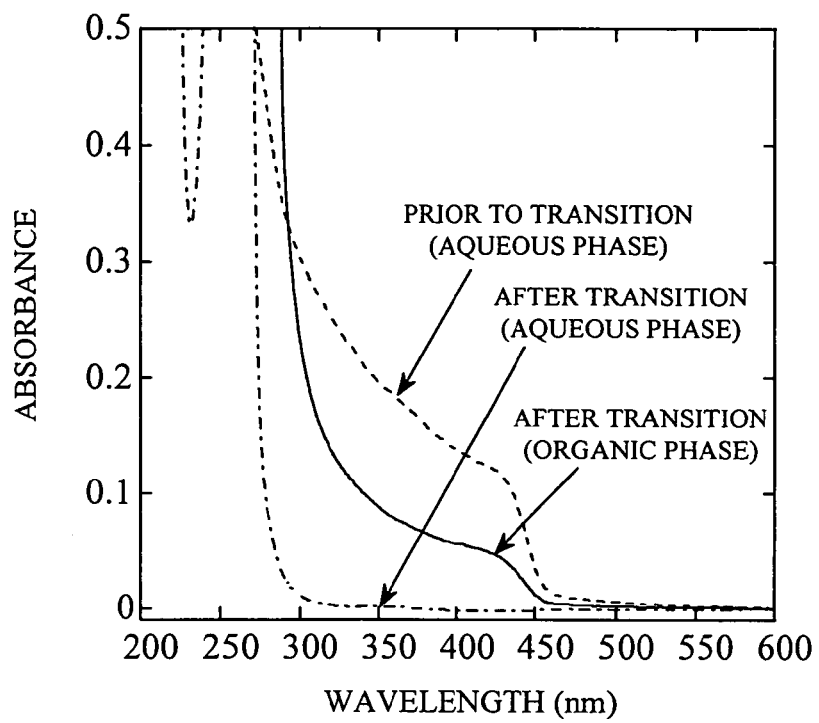
FIG. 3 shows the absorption spectra of Example 2-1 before and after migration from an aqueous phase to an organic phase.
Figure 4:
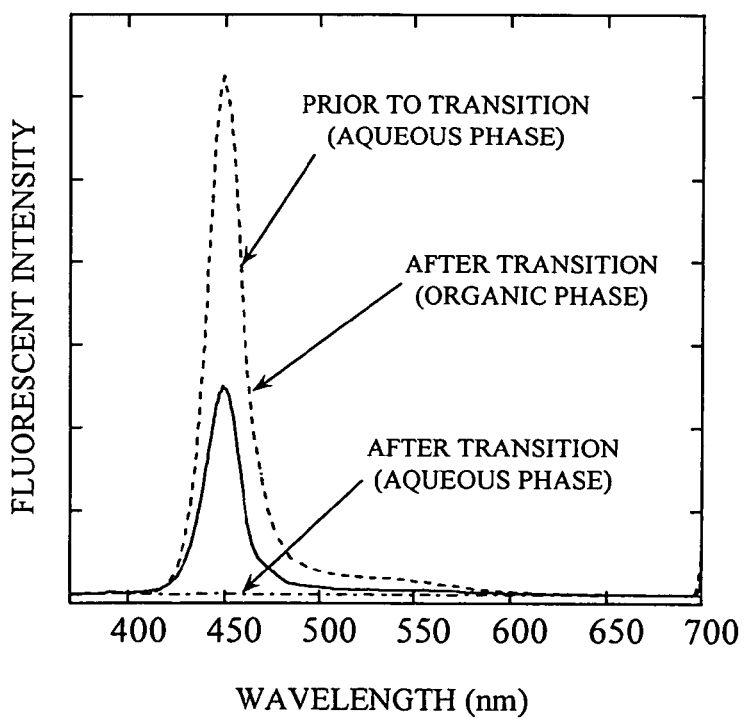
FIG. 4 shows the absorption spectra of Example 2-1 before and after migration from an aqueous phase to an organic phase.

The structure of the resultant semiconductor nanoparticles is schematically shown in FIG. 2. FIG. 3 shows the absorption spectra of the semiconductor nanoparticles before and after migration in the present example, and FIG. 4 shows their fluorescence spectra.

Example 2-2

NaOH Treatment/Hexylamine/Hexane

A mixture solution of hexane and hexylamine, the latter of an amount that is 10% that of the former, was added to an equal amount of the semiconductor nanoparticle aqueous solution prepared in Example 1-1. After violently stirring for some time, it was confirmed that an optically transparent yellow portion migrated from an aqueous phase to an organic phase through a stage in which a yellow powdery substance was observed at the water-hexane interface. Thereafter, centrifugation was carried out and the aqueous phase and the organic phase were separated. The recovered organic phase was then diluted by adding hexane to the same amount as the amount of the aforementioned aqueous solution prior to migration. The semiconductor nanoparticles that migrated to a hexane phase still maintained high-emission properties.

Figure 5:
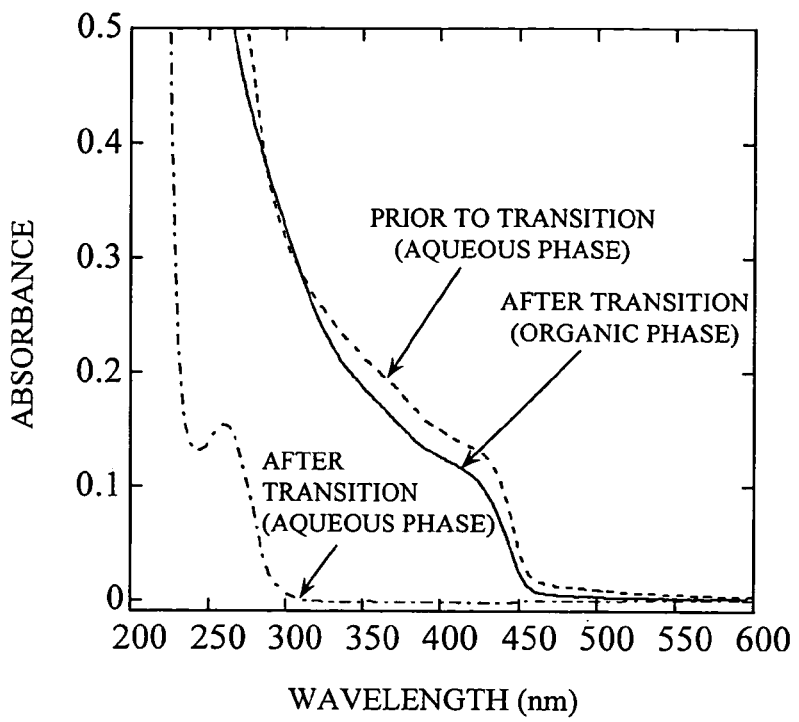
FIG. 5 shows the absorption spectra of Example 2-2 before and after migration from an aqueous phase to an organic phase.
Figure 6:
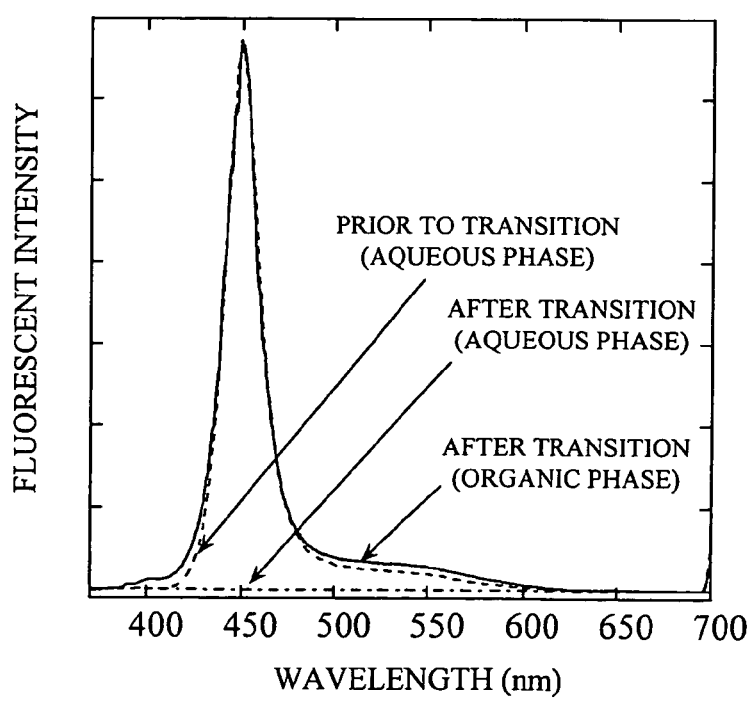
FIG. 6 shows the absorption spectra of Example 2-2 before and after migration from an aqueous phase to an organic phase.

The structure of the resultant semiconductor nanoparticles is schematically shown in FIG. 2. FIG. 5 shows the absorption spectra of the semiconductor nanoparticles before and after migration in the present example, and FIG. 6 shows their fluorescence spectra.

Example 2-3

NaOH Treatment/Hexylamine/Toluene

A mixture solution of toluene and hexylamine, the latter of an amount that is 10% that of the former, was added to an equal amount of the semiconductor nanoparticle aqueous solution prepared in Example 1-2. After violently stirring for some time, it was confirmed that an optically transparent yellow portion migrated from an aqueous phase to an organic phase through a stage in which a yellow powdery substance was observed at the water-hexane interface. Thereafter, centrifugation was carried out and the aqueous phase and the organic phase were separated. The recovered organic phase was then diluted by adding toluene to the same amount as the amount of the aforementioned aqueous solution prior to migration. The semiconductor nanoparticles that migrated to a toluene phase still maintained high-emission properties.

Figure 7:
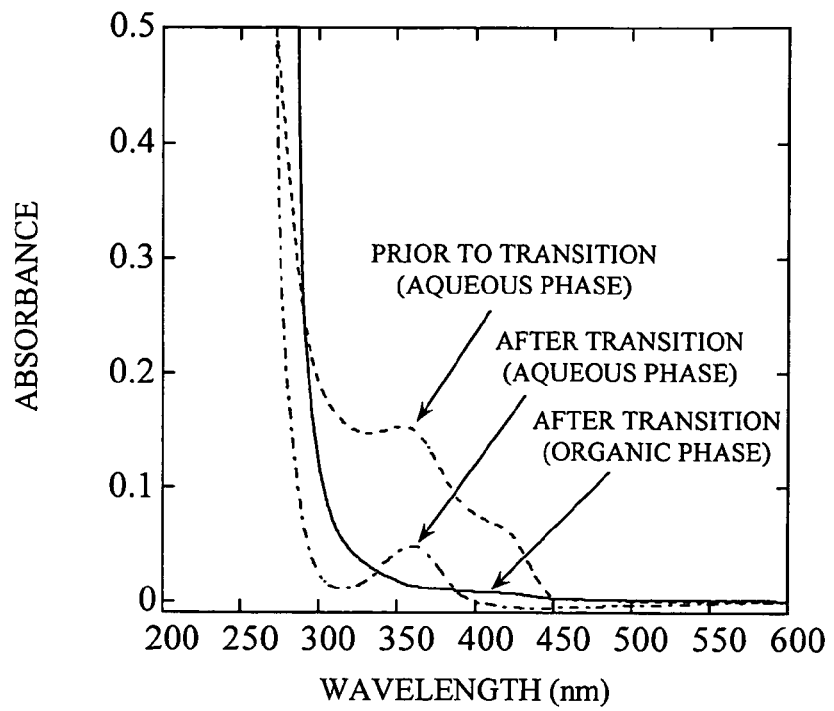
FIG. 7 shows the absorption spectra of Example 2-3 before and after migration from an aqueous phase to an organic phase.
Figure 8:
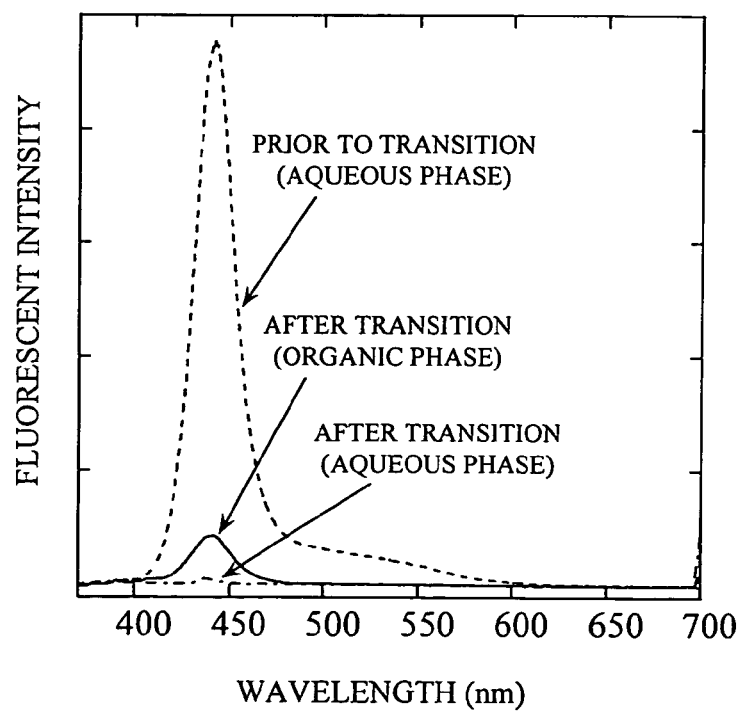
FIG. 8 shows the absorption spectra of Example 2-3 before and after migration from an aqueous phase to an organic phase.

The structure of the resultant semiconductor nanoparticles is schematically shown in FIG. 2. FIG. 7 shows the absorption spectra of the semiconductor nanoparticles before and after the migration in the present example, and FIG. 8 shows their fluorescence spectra.

Example 2-4

$NH_3$ Treatment/Hexylamine/Hexane

A mixture solution of hexane and hexylamine, the latter of an amount that is 10% that of the former, was added to an equal amount of the semiconductor nanoparticle aqueous solution prepared in Example 1-2. After violently stirring for some time, it was confirmed that an optically transparent yellow portion migrated from an aqueous phase to an organic phase through a stage in which a yellow powdery substance was observed at the water-hexane interface. Thereafter, centrifugation was carried out and the aqueous phase and the organic phase were separated. The recovered organic phase was then diluted by adding hexane to the same amount as the amount of the aforementioned aqueous solution prior to migration. The semiconductor nanoparticles that migrated to a hexane phase still maintained high-emission properties.

Figure 9:
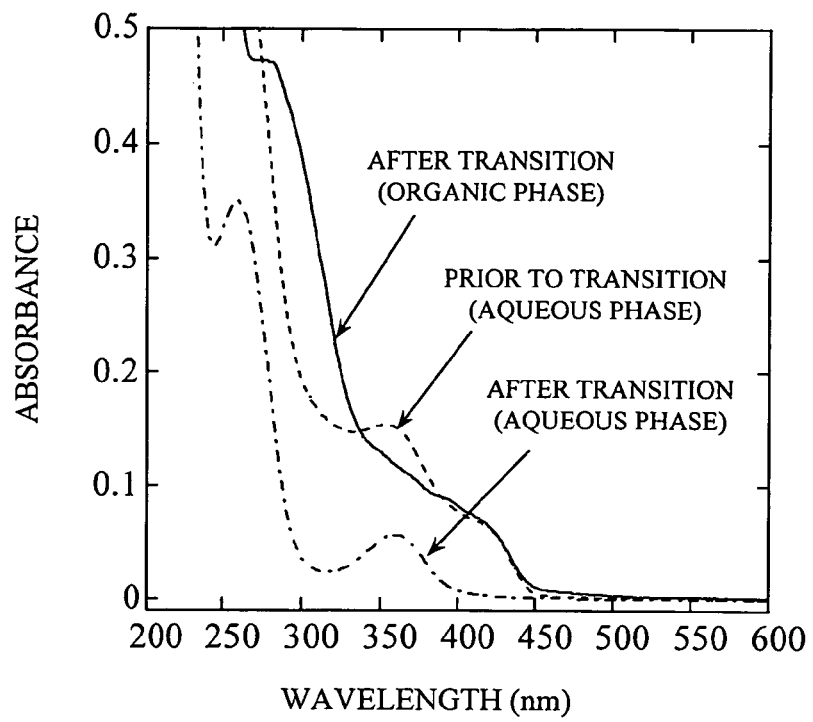
FIG. 9 shows the absorption spectra of Example 2-4 before and after migration from an aqueous phase to an organic phase.
Figure 10:
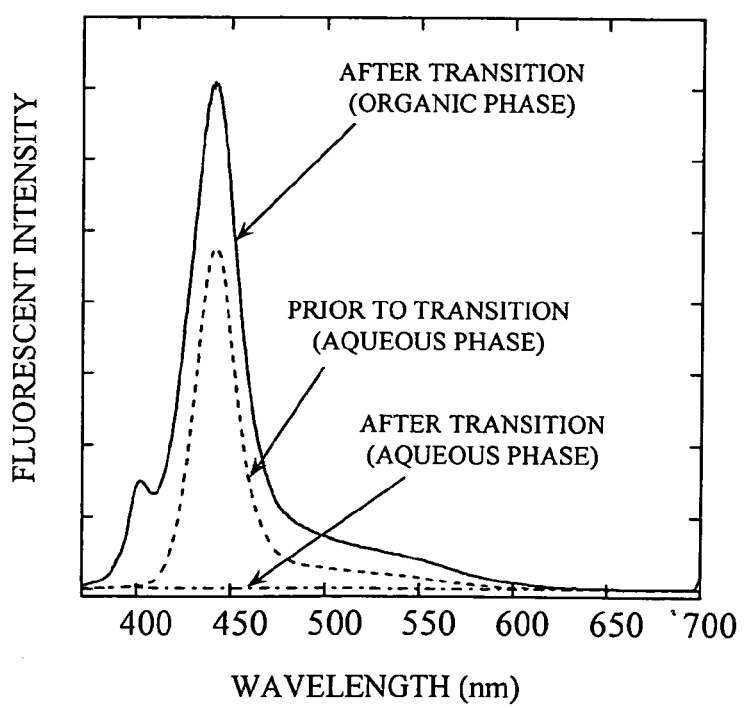
FIG. 10 shows the absorption spectra of Example 2-4 before and after migration from an aqueous phase to an organic phase.

The structure of the resultant semiconductor nanoparticles is schematically shown in FIG. 2. FIG. 9 shows the absorption spectra of the semiconductor nanoparticles before and after the migration in the present example, and FIG. 10 shows their fluorescence spectra.

Example 2-5

$NH_3$ Treatment/Dodecylamine/Toluene

A mixture solution of toluene and dodecylamine, the latter of an amount that is 10% of the former, was added to the semiconductor nanoparticle aqueous solution prepared as in Example 1-2 to a volume ratio of one to ten. An equal amount of methanol was further added to the aqueous solution. After violently stirring for some time, it was confirmed that an optically transparent yellow portion migrated from an aqueous phase to an organic phase.

In the present example, because the amount of the mixture solution containing dodecylamine was one-tenth the amount of the aqueous solution, the semiconductor nanoparticles in the mixture solution containing dodecylamine were condensed by a factor of 10 as compared to when they were in the aqueous solution. By thus condensing the semiconductor nanoparticle solution, the subsequent posttreatment and chemical denaturation can be effectively performed and better handling can be achieved. Moreover, as dodecylamine is water-insoluble, the migration of methanol from the water-soluble solvent to the organic phase was promoted.

Thereafter, centrifugation was performed and then the aqueous phase and the organic phase were separated. The recovered organic phase was diluted by adding toluene to the same absorbance as that of the aqueous solution prior to migration. The semiconductor nanoparticles that had migrated to the toluene phase still maintained high-emission properties.

Figure 11:
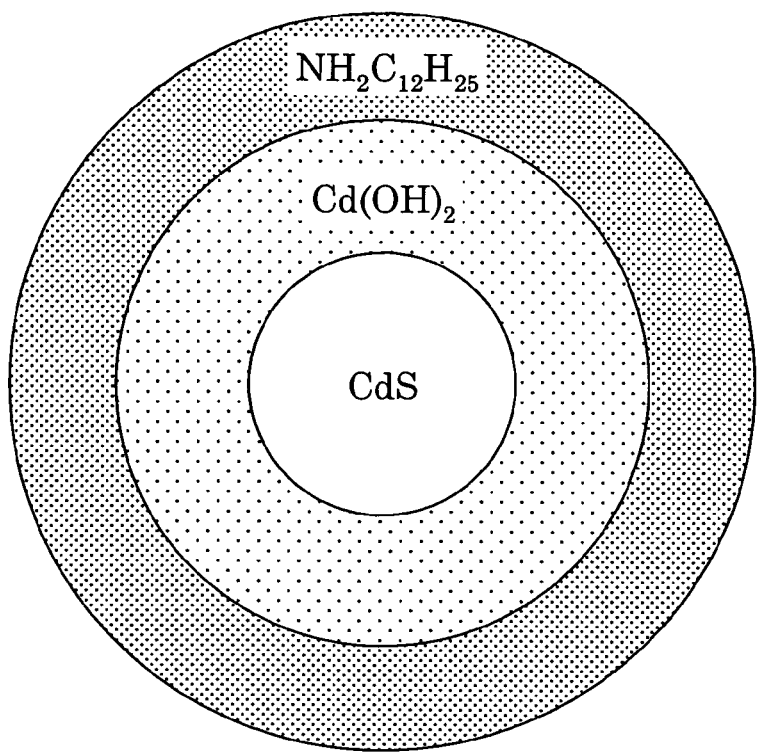
FIG. 11 shows a concrete example of a semiconductor nanoparticle of the invention that has an excellent durability.
Figure 12:
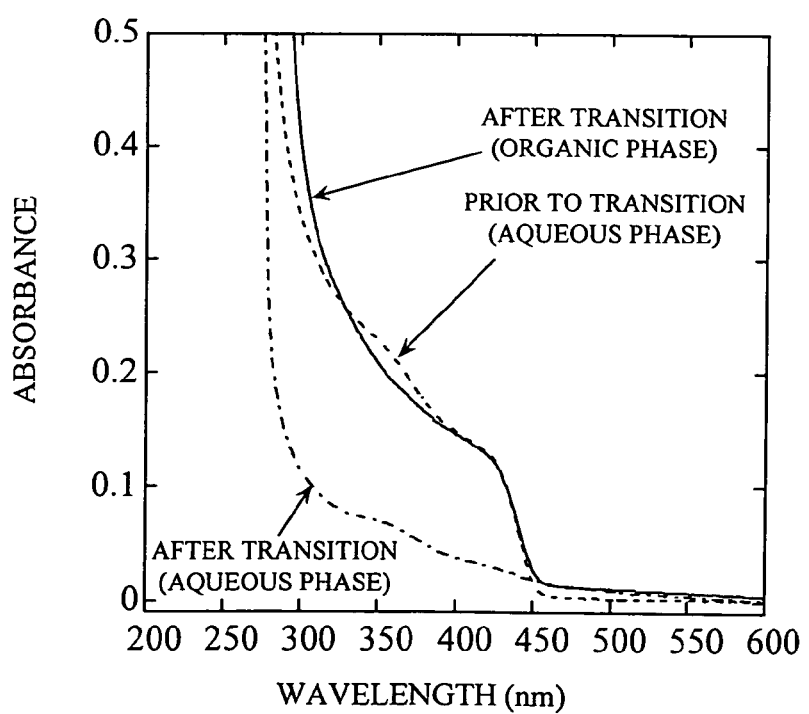
FIG. 12 shows the absorption spectra of Example 2-5 before and after migration from an aqueous phase to an organic phase.
Figure 13:
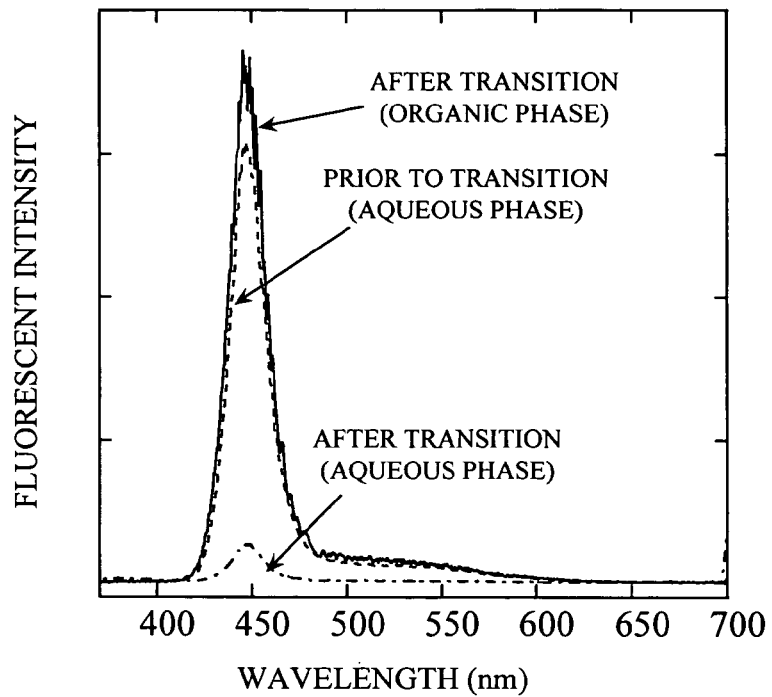
FIG. 13 shows the absorption spectra of Example 2-5 before and after migration from an aqueous phase to an organic phase.

The structure of the resultant semiconductor nanoparticles is shown in FIG. 11. FIG. 12 shows the absorption spectra of the semiconductor nanoparticles before and after the migration. FIG. 13 shows their fluorescence spectra.

Example 2-6

$NH_3$/Dodecylamine/Hexane

A mixture solution of hexane and dodecylamine, the latter of an amount that is 10% of the former, was added to the semiconductor nanoparticle aqueous solution prepared as in Example 1-2 to a volume ratio of one to ten. An equal amount of methanol was further added to the aqueous solution. After violently stirring for some time, it was confirmed that an optically transparent yellow portion migrated from an aqueous phase to an organic phase. Thereafter, centrifugation was performed and then the aqueous phase and the organic phase were separated. The recovered organic phase was diluted by adding hexane to the same absorbance as that of the aqueous solution prior to migration. The semiconductor nanoparticles that had migrated to the hexane phase still maintained high-emission properties.

Figure 14:
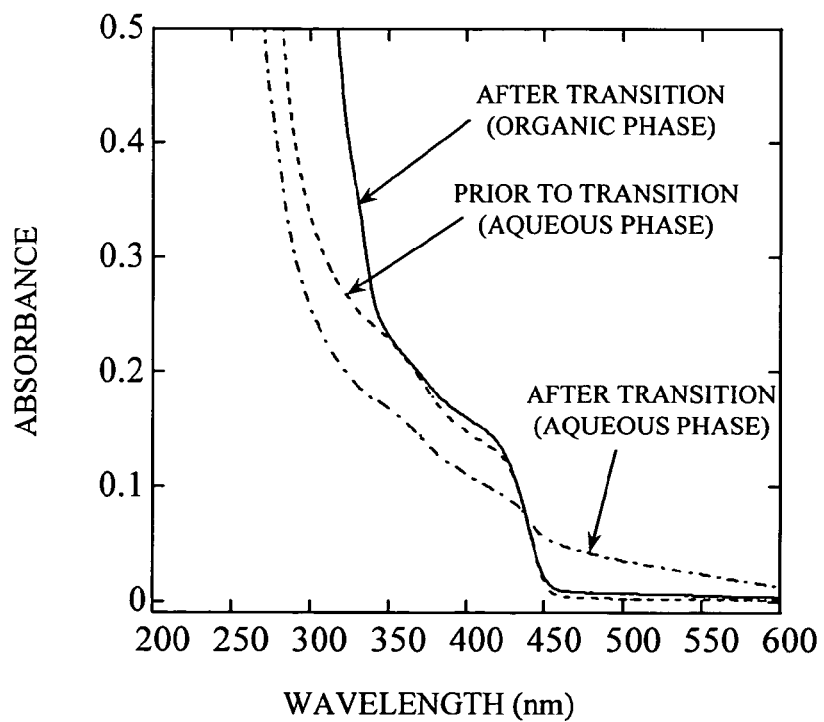
FIG. 14 shows the absorption spectra of Example 2-6 before and after migration from an aqueous phase to an organic phase.
Figure 15:
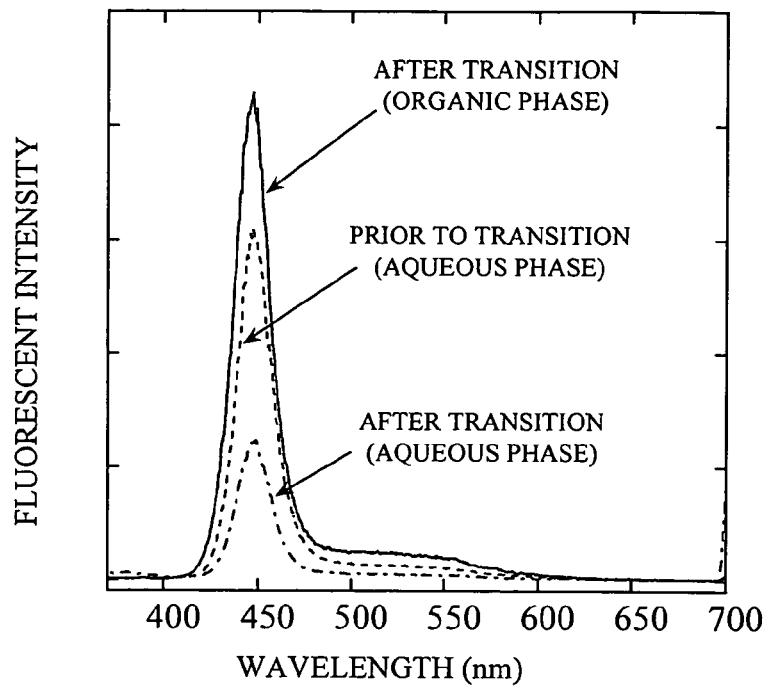
FIG. 15 shows the absorption spectra of Example 2-6 before and after migration from an aqueous phase to an organic phase.

The structure of the resultant semiconductor nanoparticles is shown in FIG. 11. FIG. 14 shows the absorption spectra of the semiconductor nanoparticles before and after the migration. FIG. 15 shows their fluorescence spectra.

Example 2-7

NaOH Treatment/Trioctylmethylammonium/Toluene

A mixture solution of toluene and 86% trioctylmethylammonium chloride-chloroform, with the ratio of 1 µL/mL, was added to the semiconductor nanoparticle aqueous solution prepared as in Example 1-1 to a volume ratio of one to ten. After violently stirring for some time, it was confirmed that an optically transparent yellow portion migrated from an aqueous phase to an organic phase. Thereafter, centrifugation was performed and then the aqueous phase and the organic phase were separated. The recovered organic phase was diluted by adding toluene to the same absorbance as that of the aqueous solution prior to migration. The semiconductor nanoparticles that had migrated to the toluene phase still maintained high-emission properties.

Figure 16:
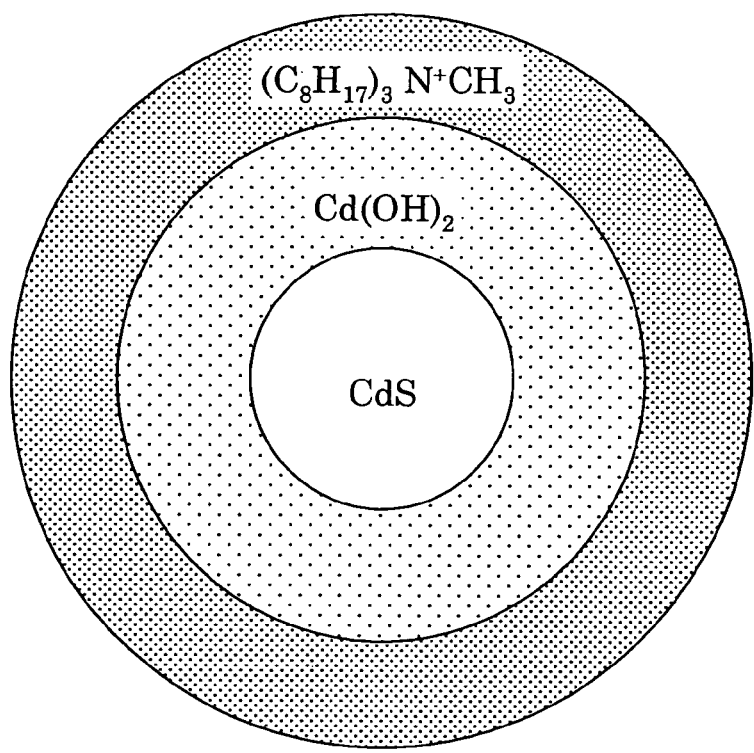
FIG. 16 shows a concrete example of a semiconductor nanoparticle of the invention that has an excellent durability.
Figure 17:
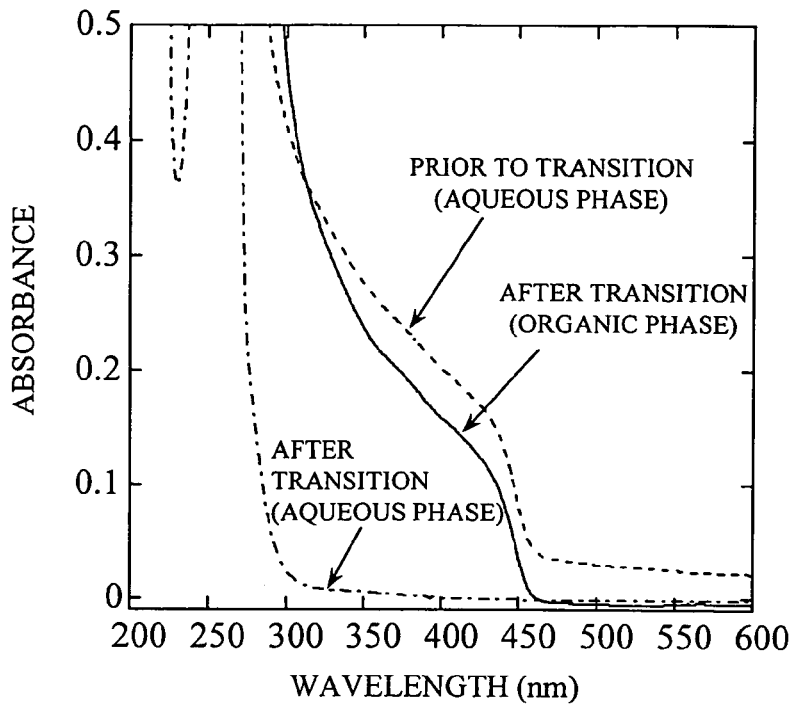
FIG. 17 shows the absorption spectra of Example 2-7 before and after migration from an aqueous phase to an organic phase.
Figure 18:
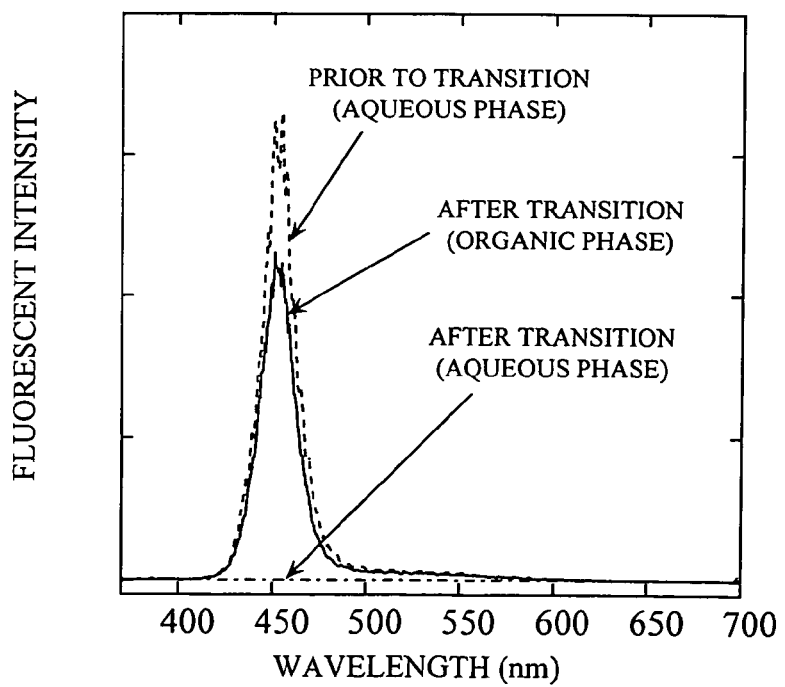
FIG. 18 shows the absorption spectra of Example 2-7 before and after migration from an aqueous phase to an organic phase.

The structure of the resultant semiconductor nanoparticles is shown in FIG. 16. FIG. 17 shows the absorption spectra of the semiconductor nanoparticles before and after the migration. FIG. 18 shows their fluorescence spectra.

Example 2-8

NaOH Treatment/Trioctylmethylammonium/Hexane

A mixture solution of hexane and 86% trioctylmethylammonium chloride-chloroform, with the ratio of 1 µL/mL, was added to the semiconductor nanoparticle aqueous solution prepared as in Example 1-1 to a volume ratio of one to ten. After violently stirring for some time, it was confirmed that an optically transparent yellow portion migrated from an aqueous phase to an organic phase. Thereafter, centrifugation was performed and then the aqueous phase and the organic phase were separated. The recovered organic phase was diluted by adding hexane to the same absorbance as that of the aqueous solution prior to migration. The semiconductor nanoparticles that had migrated to the hexane phase still maintained high-emission properties.

Figure 19:
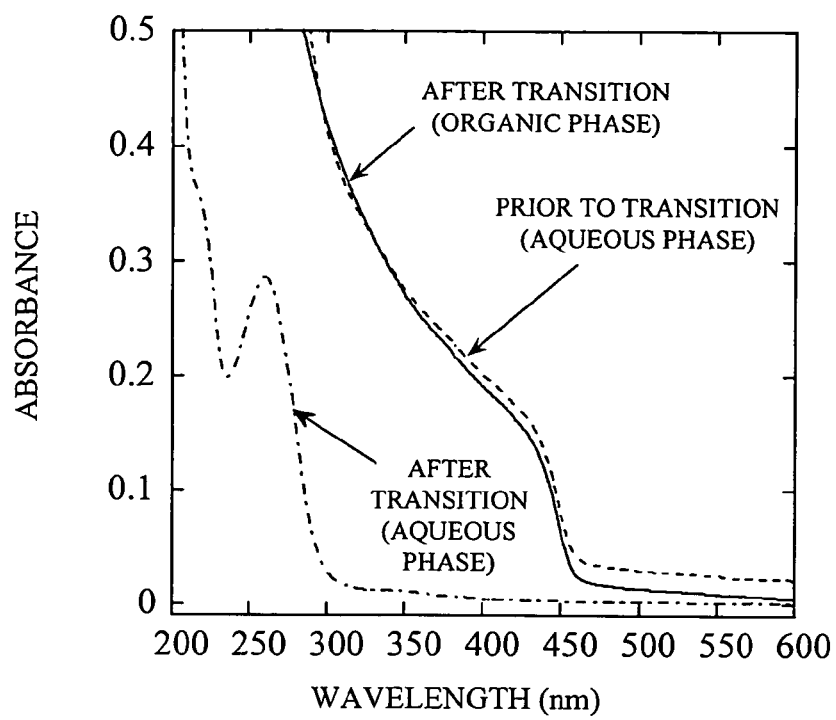
FIG. 19 shows the absorption spectra of Example 2-8 before and after migration from an aqueous phase to an organic phase.
Figure 20:
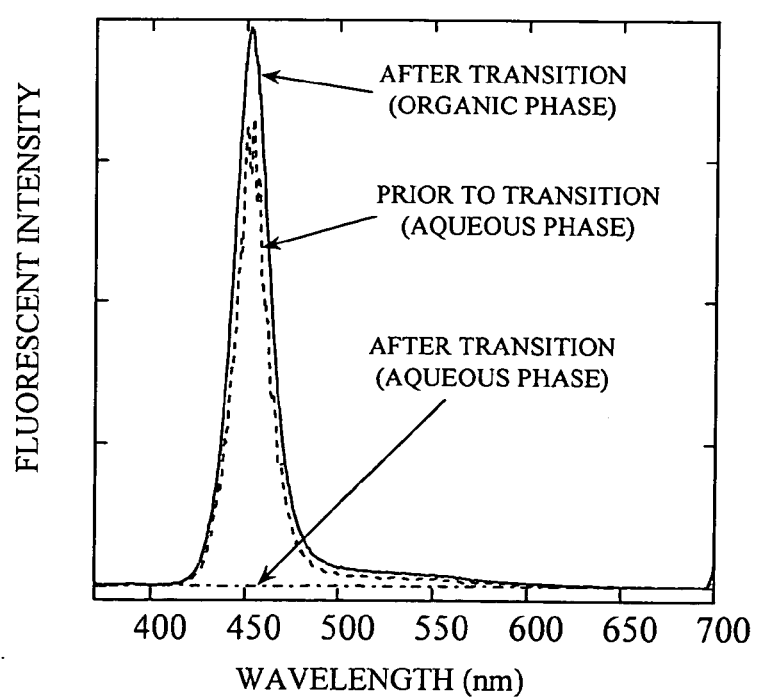
FIG. 20 shows the absorption spectra of Example 2-8 before and after migration from an aqueous phase to an organic phase.

The structure of the resultant semiconductor nanoparticles is shown in FIG. 16. FIG. 19 shows the absorption spectra of the semiconductor nanoparticles before and after the migration. FIG. 20 shows their fluorescence spectra.

Example 2-9

$NH_3$ Treatment/Trioctylmethylammonium/Toluene

A mixture solution of toluene and 86% trioctylmethylammonium chloride-chloroform, with the ratio of 1 µL/mL, was added to the semiconductor nanoparticle aqueous solution prepared as in Example 1-2 to a volume ratio of one to ten. After violently stirring for some time, it was confirmed that an optically transparent yellow portion migrated from an aqueous phase to an organic phase. Thereafter, centrifugation was performed and then the aqueous phase and the organic phase were separated. The recovered organic phase was diluted by adding toluene to the same absorbance as that of the aqueous solution prior to migration. The semiconductor nanoparticles that had migrated to the toluene phase still maintained high-emission properties.

Figure 21:
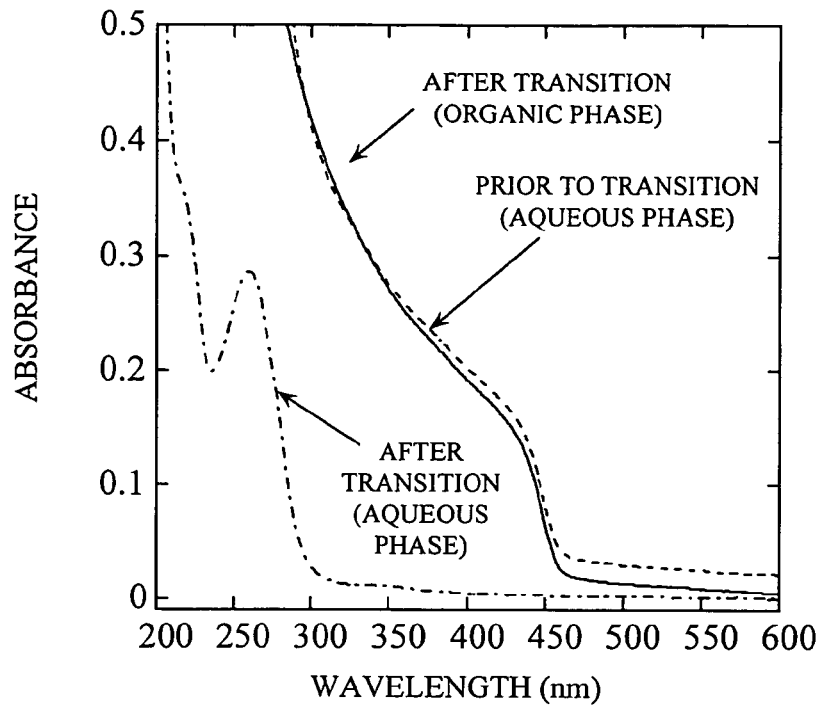
FIG. 21 shows the absorption spectra of Example 2-9 before and after migration from an aqueous phase to an organic phase.
Figure 22:
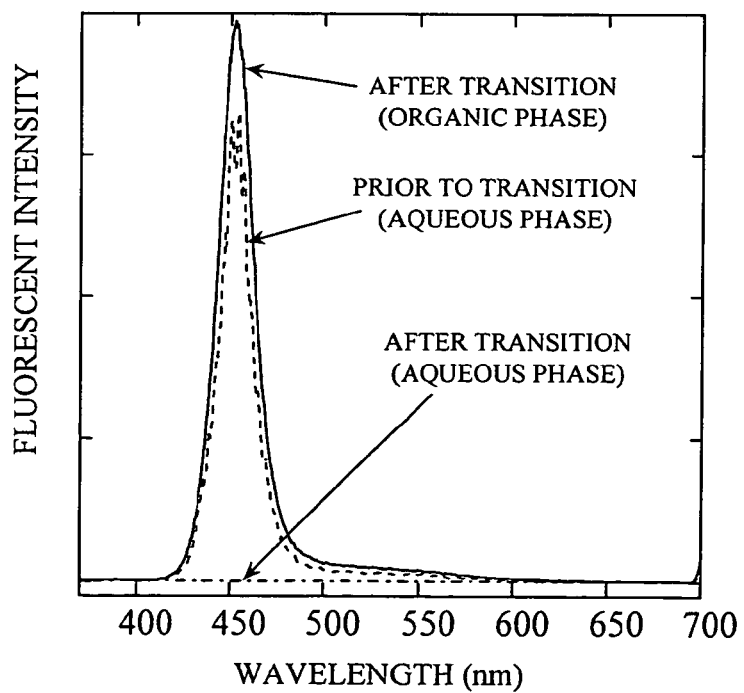
FIG. 22 shows the absorption spectra of Example 2-9 before and after migration from an aqueous phase to an organic phase.

The structure of the resultant semiconductor nanoparticles is shown in FIG. 16. FIG. 21 shows the absorption spectra of the semiconductor nanoparticles before and after the migration. FIG. 22 shows their fluorescence spectra.

Example 2-10

NH₃ Treatment/Trioctylmethylammonium/Hexane

A mixture solution of hexane and 86% trioctylmethylammonium chloride-chloroform, with the ratio of 1 µL/mL, was added to the semiconductor nanoparticle aqueous solution prepared as in Example 1-2 to a volume ratio of one to ten. After violently stirring for some time, it was confirmed that an optically transparent yellow portion migrated from an aqueous phase to an organic phase. Thereafter, centrifugation was performed and then the aqueous phase and the organic phase were separated. The recovered organic phase was diluted by adding hexane to the same absorbance as that of the aqueous solution prior to migration. The semiconductor nanoparticles that had migrated to the hexane phase still maintained high-emission properties.

Figure 23:
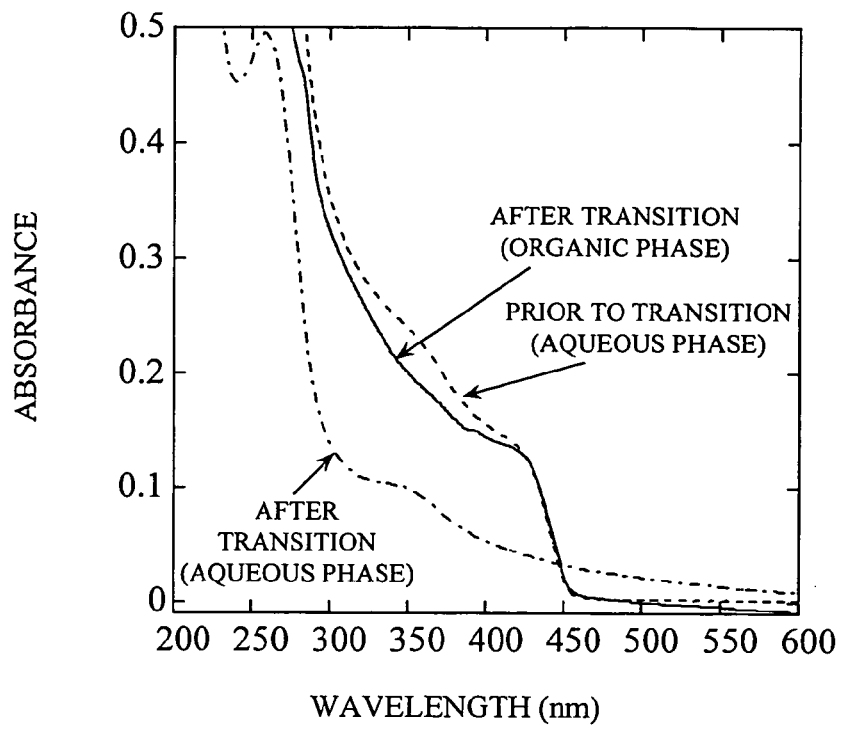
FIG. 23 shows the absorption spectra of Example 2-10 before and after migration from an aqueous phase to an organic phase.
Figure 24:
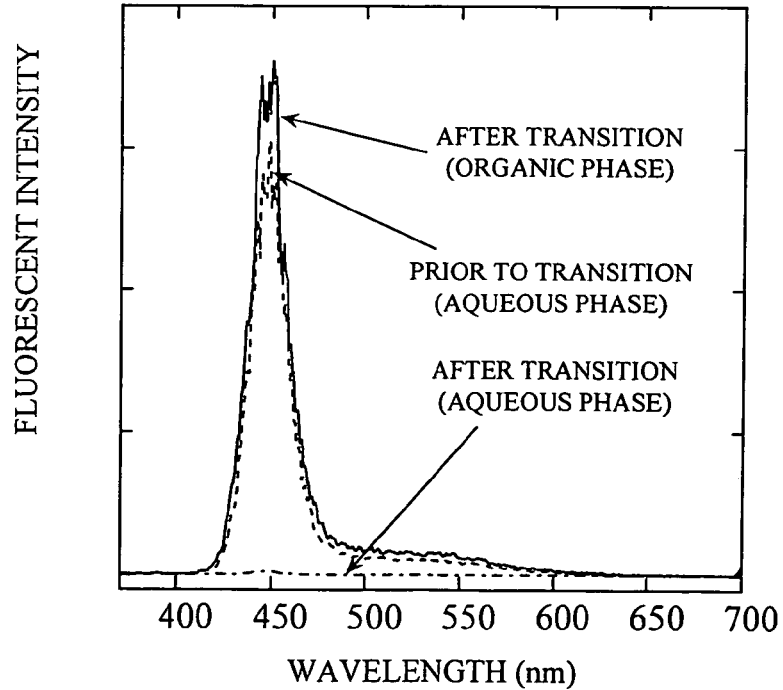
FIG. 24 shows the absorption spectra of Example 2-10 before and after migration from an aqueous phase to an organic phase.

The structure of the resultant semiconductor nanoparticles is shown in FIG. 16. FIG. 23 shows the absorption spectra of the semiconductor nanoparticles before and after the migration. FIG. 24 shows their fluorescence spectra.

Example 2-11

NH₃ Treatment/Tridodecylmethylammonium/Toluene

A mixture solution of toluene and tridodecylmethylammonium chloride, with the ratio of 1 mg/mL, was added to the semiconductor nanoparticle aqueous solution prepared as in Example 1-2 to a volume ratio of one to ten. After violently stirring for some time, it was confirmed that an optically transparent yellow portion migrated from an aqueous phase to an organic phase. Thereafter, centrifugation was performed and then the aqueous phase and the organic phase were separated. The recovered organic phase was diluted by adding toluene to the same absorbance as that of the aqueous solution prior to migration. The semiconductor nanoparticles that had migrated to the toluene phase still maintained high-emission properties.

Figure 25:
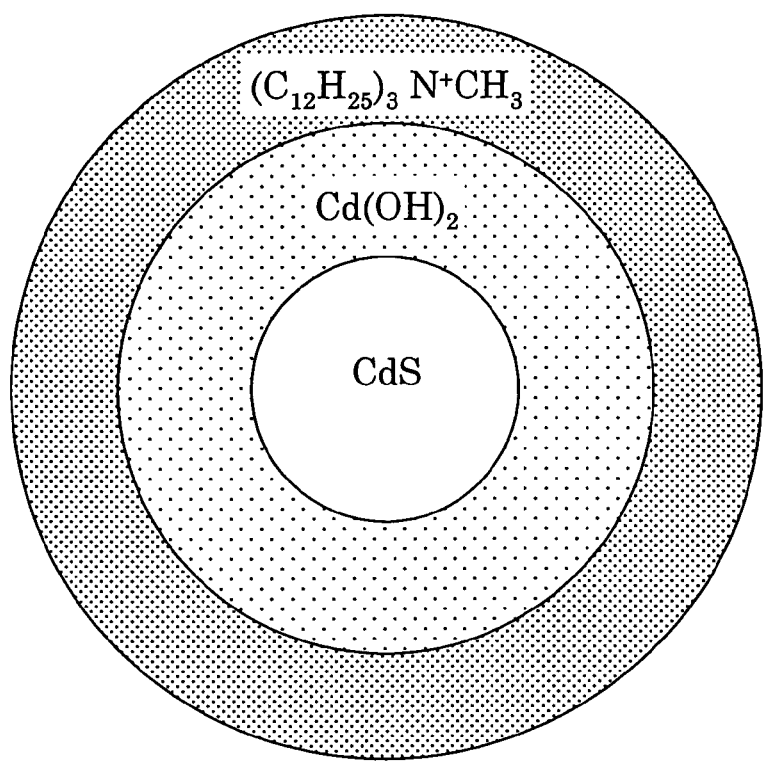
FIG. 25 shows a concrete example of a semiconductor nanoparticle of the invention that has an excellent durability.
Figure 26:
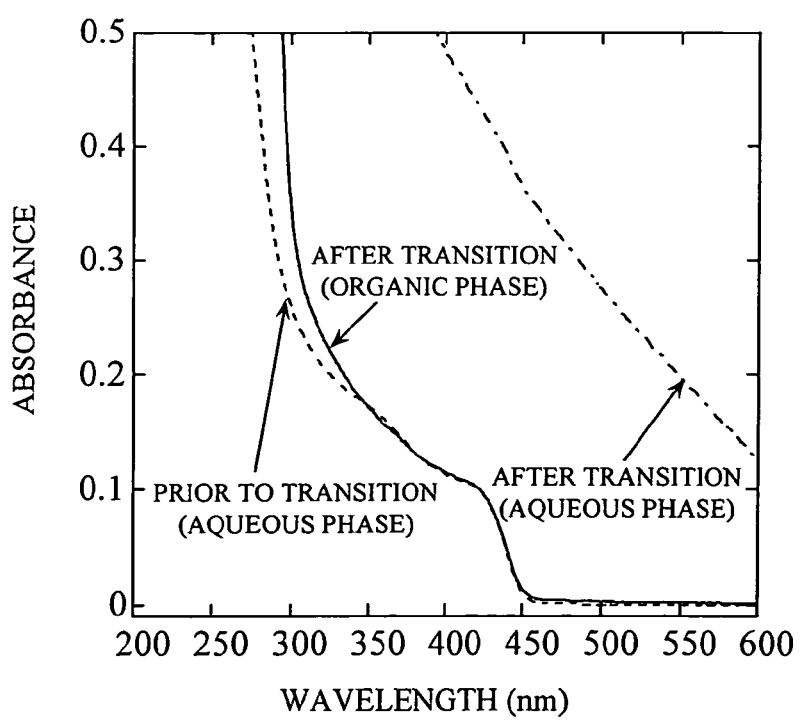
FIG. 26 shows the absorption spectra of Example 2-11 before and after migration from an aqueous phase to an organic phase.
Figure 27:
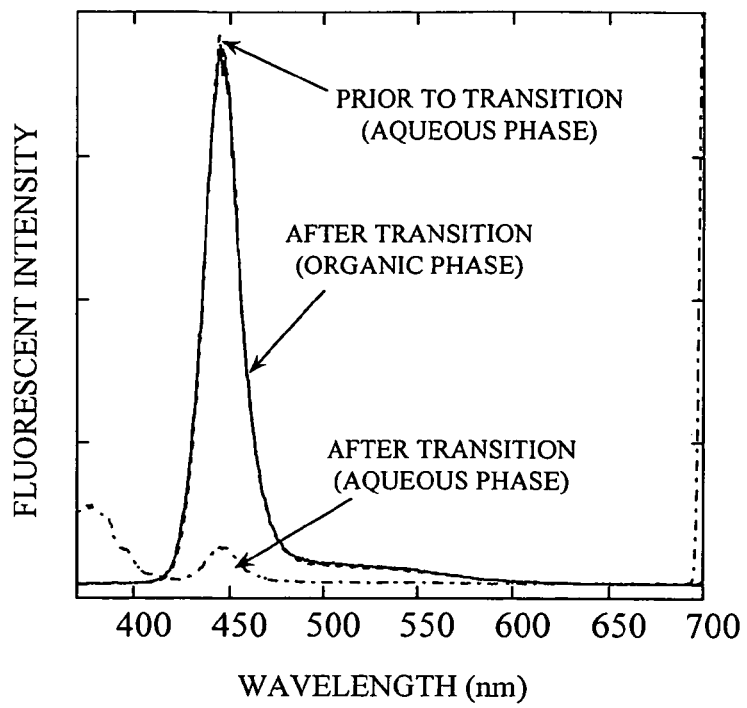
FIG. 27 shows the absorption spectra of Example 2-11 before and after migration from an aqueous phase to an organic phase.

The structure of the resultant semiconductor nanoparticles is shown in FIG. 25. FIG. 26 shows the absorption spectra of the semiconductor nanoparticles before and after the migration. FIG. 27 shows their fluorescence spectra.

Example 2-12

NH₃ Treatment/Tridodecylmethylammonium/Hexane

A mixture solution of hexane and tridodecylmethylammonium chloride, with the ratio of 1 mg/mL, was added to the semiconductor nanoparticle aqueous solution prepared as in Example 1-2 to a volume ratio of one to ten. After violently stirring for some time, it was confirmed that an optically transparent yellow portion migrated from an aqueous phase to an organic phase. Thereafter, centrifugation was performed and then the aqueous phase and the organic phase were separated. The recovered organic phase was diluted by adding hexane to the same absorbance as that of the aqueous solution prior to migration. The semiconductor nanoparticles that had migrated to the hexane phase still maintained high-emission properties.

Figure 28:
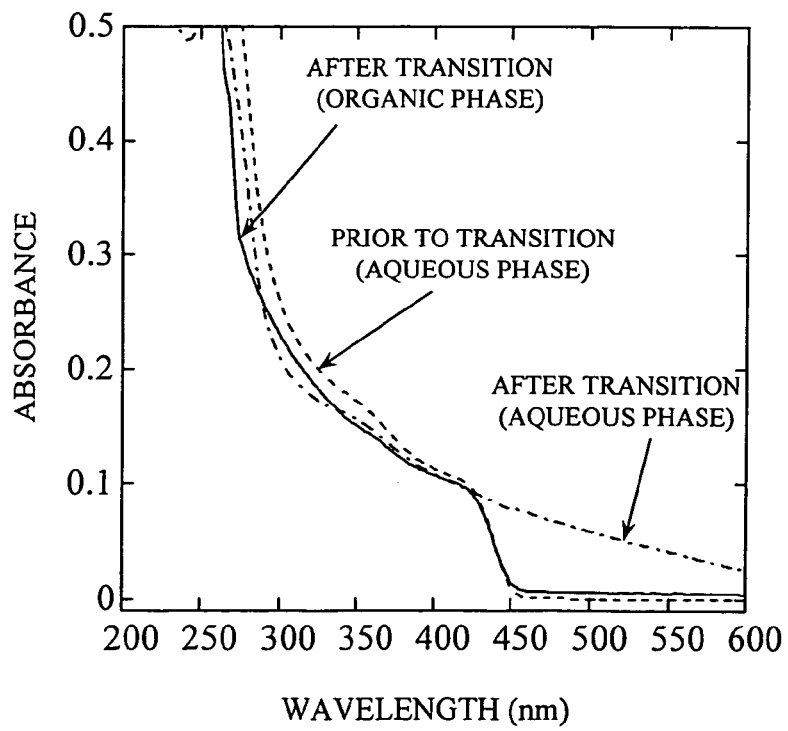
FIG. 28 shows the absorption spectra of Example 2-12 before and after migration from an aqueous phase to an organic phase.
Figure 29:
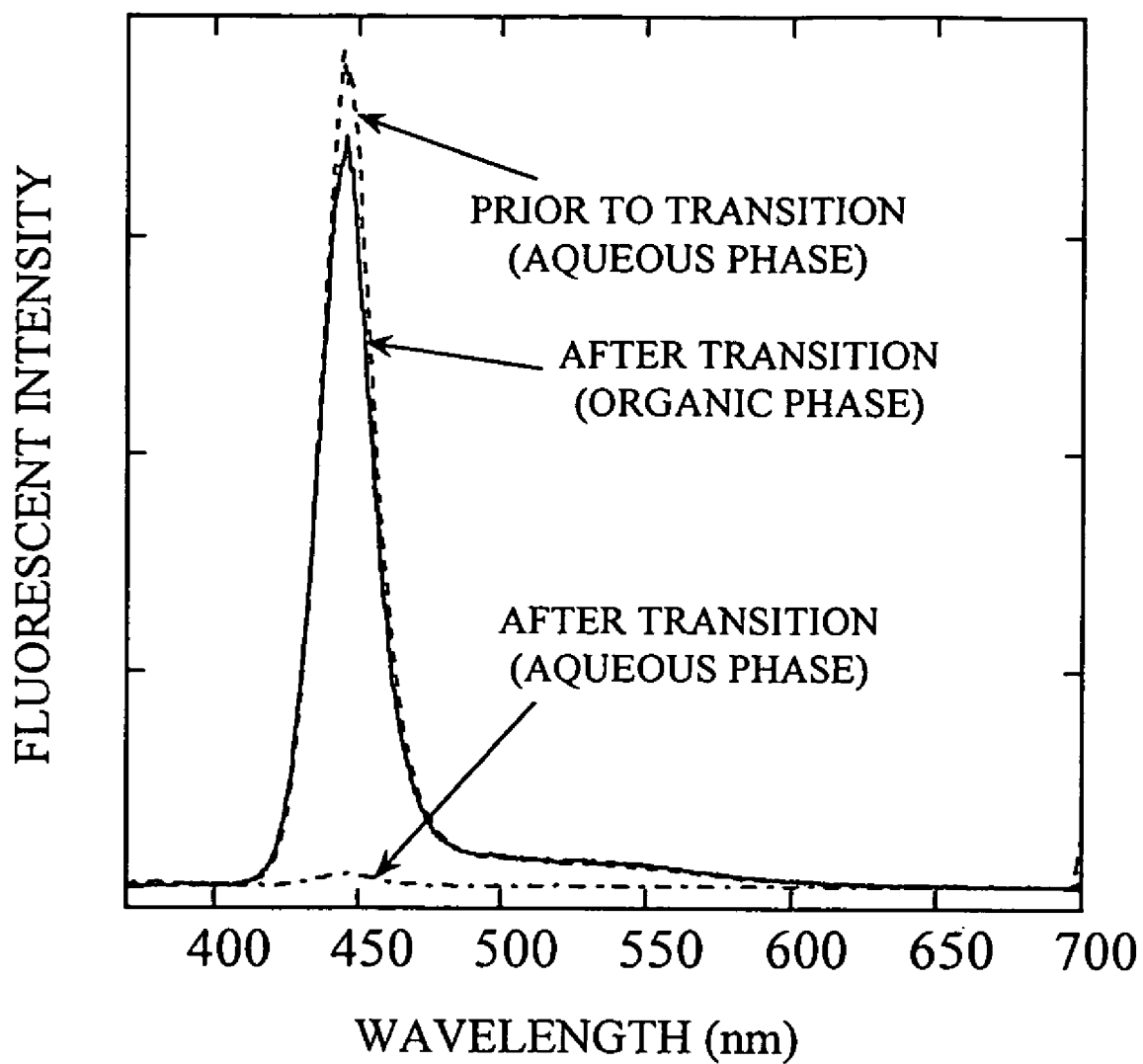
FIG. 29 shows the absorption spectra of Example 2-12 before and after migration from an aqueous phase to an organic phase.

The structure of the resultant semiconductor nanoparticles is shown in FIG. 25. FIG. 28 shows the absorption spectra of the semiconductor nanoparticles before and after the migration. FIG. 29 shows their fluorescence spectra.

In case a precipitate or the like is formed during the above-described series of processes, a ultrasound washer may be used.

Thus, the semiconductor nanoparticles provided with a surface treatment such as OH coating or ammonia treatment were successfully coated with organic matter without causing any particular changes in their fluorescent properties. Moreover, it was confirmed that the semiconductor nanoparticles after the coating maintained their fluorescent properties for a long time. The methods of the invention can be employed for coating semiconductor nanoparticles with an organic matter such as a polymer in order to furnish them with resistance against external factors. In accordance with the invention, it is thought that CdS nanoparticles with a similar surface condition to cadmium hydroxide are further coated with an organic matter (FIG. 2).

For the stabilizing agent, a wide variety of substances are available, and the substances that have been described with reference to the methods of the invention are merely examples. Likewise, the particular types of organic matter, solvents, and the concentrations of the organic matters that have been described above with reference to particular examples should not be taken as limiting the invention.

The semiconductor nanoparticles according to the invention are very durable and can be adapted for fluorescent reagents or optical devices by taking advantage of their fluorescent properties.

What is claimed is:

1. A semiconductor nanoparticle comprising a core with a core surface modified to include at least one electron-releasing group thereon; and an organic material layer formed over said modified core surface, wherein said modified core surface including at least one electron-releasing group and said organic material layer are made of different materials.

2. The semiconductor nanoparticle according to claim 1, wherein said electron-releasing group comprises at least one selected from the group consisting of —OR, —OCH₂R, —OCOCH₂R, —NHR, —N(CH₂R)₂, —NHCOCH₂R, —CH₂R, and —C₆H₄R, where R is selected from hydrogen and substituted or unsubstituted hydrocarbon groups.

3. The semiconductor nanoparticle according to claim 1, wherein said electron-releasing group is hydroxyl group.

4. The semiconductor nanoparticle according to claim 1, wherein said surface comprises more than one layer containing at least one electron-releasing group.

5. The semiconductor nanoparticle according to claim 4, wherein all of part of said organic material layer, or said layer containing said electron-releasing group and said organic material layer comprise at least one selected from the group consisting of primary amines (R₁NH₂), secondary amines (R₁R₂NH), tertiary amines (R₁R₂R₃N), quaternary ammonium compounds (R₄R₅R₆R₇N⁺), where R₁ to R₇ are selected from hydrogen and substituted or unsubstituted hydrocarbon groups.

6. The semiconductor nanoparticle according to claim 5, wherein said R₁ to R₇ comprise a substituent at an opposite terminal to an amino group or ammonium group.

7. The semiconductor nanoparticle according to claim 5, wherein said primary amines (R₁NH₂) comprise alkylamines with a carbon number of 4 to 100, and said quaternary ammonium compounds ($R_4R_5R_6R_7N^+$) comprise ammonium having two or more alkyl chains with a carbon number of 4 to 100.

8. The semiconductor nanoparticle according to claim 1, wherein said organic material layer is formed by polymerization.

9. The semiconductor nanoparticle according to claim 1, comprising a semiconductor nanoparticle whose material is at least one selected from the group consisting of ZnO, ZnS, ZnSe, ZnTe, CdO, CdS, CdMnS, CdSe, CdMnSe, CdTe, CdMnTe, HgS, HgSe, HgSe, HgTe, InP, InAs, InSb, InN, GaN, GaP, GaAs, GaSb, $TiO_2$, $WO_3$, PbS, PbSe, MgTe, AlAs, AlP, AlSb, AlS, Ge, and Si, or a semiconductor nanoparticle having a multilayer structure consisting of a core portion and a shell portion that are made of at least one selected from said group.

10. The semiconductor nanoparticle according to claim 1, wherein the particle size of said semiconductor nanoparticle exhibits a variation of less than 10% rms in diameter, thereby achieving monodispersion.

11. The semiconductor nanoparticle according to claim 1, wherein said semiconductor nanoparticle emits light in a narrow spectrum range of less than 60 nm in terms of full width at half maximum (FWHM) upon being irradiated with excitation light.

12. A fluorescent reagent comprising the semiconductor nanoparticle according to claim 1.

13. An optical device comprising the semiconductor nanoparticle according to claim 1.

14. An inorganic, organic, or organic/inorganic compound material comprising a semiconductor nanoparticle comprising a core with a core surface modified to include at least one electron-releasing group thereon; and an organic material layer formed over said modified core surface, wherein said modified core surface including at least one electron-releasing group and said organic material layer are made of different materials.

15. A semiconductor nanoparticle comprising a core which comprises CdS with a core surface modified to include $Cd(OH)_2$, and an organic material layer formed over the modified core surface, wherein said organic material comprises at least one selected from the group consisting of primary amines ($R_1NH_2$), secondary amines ($R_1R_2NH$), tertiary amines ($R_1R_2R_3N$), quaternary ammonium compounds ($R_4R_5R_6R_7N^+$), where $R_1$ to $R_7$ are selected from hydrogen and substituted or unsubstituted hydrocarbon groups.

16. The semiconductor nanoparticle according to claim 15, wherein said organic material comprises at least one selected from the group consisting of hexylamine, dodecylamine, trioctylmethylammonium, and tridodecylmethyl ammonium.

* * * * *